US010536093B2

(12) United States Patent
Perreault

(10) Patent No.: US 10,536,093 B2
(45) Date of Patent: Jan. 14, 2020

(54) HIGH-FREQUENCY VARIABLE LOAD INVERTER AND RELATED TECHNIQUES

(71) Applicant: Massachusetts Institute of Technology, Cambridge, MA (US)

(72) Inventor: David J. Perreault, Andover, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/635,896

(22) Filed: Jun. 28, 2017

(65) Prior Publication Data

US 2017/0373609 A1    Dec. 28, 2017

Related U.S. Application Data

(60) Provisional application No. 62/355,414, filed on Jun. 28, 2016.

(51) Int. Cl.
| H02M 7/48 | (2007.01) |
| H02M 7/493 | (2007.01) |
| H02M 1/08 | (2006.01) |
| H02M 1/00 | (2006.01) |

(52) U.S. Cl.
CPC .......... H02M 7/493 (2013.01); H02M 1/083 (2013.01); *H02M 2001/0058* (2013.01); *H02M 2007/4815* (2013.01); *H02M 2007/4822* (2013.01); *Y02B 70/1441* (2013.01); *Y02B 70/1491* (2013.01)

(58) Field of Classification Search
None
See application file for complete search history.

(56) References Cited

U.S. PATENT DOCUMENTS

| 2,210,028 A | 8/1940 | Doherty | |
| 9,755,576 B2* | 9/2017 | Perreault | H03F 3/2176 |
| 2007/0064457 A1* | 3/2007 | Perreault | H02M 3/155 |
| | | | 363/78 |
| 2007/0171680 A1* | 7/2007 | Perreault | H02M 1/34 |
| | | | 363/16 |

(Continued)

OTHER PUBLICATIONS

Al Bastami, et al.; "Dynamic Matching System for Radio-Frequency Plasma Generation;" 2016 IEEE Energy Conversion Congress and Exposition; Sep. 2016; 7 pages.

(Continued)

*Primary Examiner* — Jue Zhang
*Assistant Examiner* — Henry E Lee, III
(74) *Attorney, Agent, or Firm* — Daly, Crowley, Mofford & Durkee, LLP

(57) ABSTRACT

Inverter systems, circuits and associated control techniques for providing efficient delivery of high-frequency (HF) power and radio-frequency (RF) power into variable load impedances while maintaining resistive/inductive loading of the constituent inverters for zero voltage switching (ZVS) are described. The inverter architecture and associated control techniques for providing efficient delivery of HF into variable load impedances includes a first inverter having an output coupled to an input of an immittance converter. An output of the immittance converter is coupled to a second inverter. The second inverter maybe either serially or parallel coupled between the output of the immittance converter and a load.

22 Claims, 12 Drawing Sheets

(56) References Cited

U.S. PATENT DOCUMENTS

| | | | | |
|---|---|---|---|---|
| 2009/0278520 | A1* | 11/2009 | Perreault | H02M 3/07 323/282 |
| 2013/0221753 | A1* | 8/2013 | Perreault | G05F 1/571 307/77 |
| 2013/0241625 | A1* | 9/2013 | Perreault | H03F 1/0294 327/355 |
| 2013/0314948 | A1* | 11/2013 | Perreault | H02M 7/497 363/8 |
| 2015/0023063 | A1* | 1/2015 | Perreault | H02M 3/337 363/17 |
| 2015/0295497 | A1* | 10/2015 | Perreault | H02M 3/07 363/21.03 |
| 2016/0087590 | A1* | 3/2016 | Menegoli | H01G 7/06 330/297 |
| 2016/0181987 | A1* | 6/2016 | Perreault | H03F 3/2176 330/251 |
| 2016/0190940 | A1* | 6/2016 | Yan | H02M 3/285 363/17 |

OTHER PUBLICATIONS

Borage, et al.; "Resonant Immittance Converter Topologies" IEEE Transactions on industrial Electronics; vol. 58; No. 3; Mar. 2011; pp. 971-978; 8 pages.

De Rooij, et al.; "aGaN FET based 6.78 MHz Differential-Mode ZVS Class D AirFuel Class 4 Wireless Power Amplifier;" PCIM Europe 2016; Proceedings of International Exhibition and Conference for Power Electronics, Intelligent Motion, Renewable Energy and Energy Management; May 10-12, 2016; 8 pages.

Hamill; "Class DE Inverters and Rectifiers for DC-DC Conversion;" 1996 IEEE Power Electronics Specialists Conference; Jun. 1996; pp. 854-860; 7 pages.

Hamill; "Impedance Plane Analysis of Class DE Amplifier;" Electronics Letters; vol. 30; No. 23; Nov. 10, 1994; pp. 1905-1906; 2 pages.

Han, et al.; "Resistance Compression Networks for Radio-Frequency Power Conversion;" IEEE Transactions on Power Electronics; vol. 22; No. 1; Jan. 2007; pp. 41-53; 13 pages.

Kazimierczuk, et al.; "Exact Analysis of Class E Tuned Power Amplifier at any Q and Switch Duty Cycle;" IEEE Transactions on Circuits and Systems; vol. cas-24; No. 2; Feb. 1987; pp. 149-159; 11 pages.

Lim, et al.; "An Adaptive Impedance-Matching Network Based on a Novel Capacitor Matrix for Wireless Power Transfer;" IEEE Transactions on Power Electronics; vol. 29; No. 8; Aug. 2014; pp. 4403-4413; 11 pages.

Pengelly, et al.; "Doherty's Legacy: A History of the Doherty Power Amplifier from 1936 to the Present Day;" IEEE Microwave Magazine; vol. 16; No. 2; Feb. 2016, pp. 41-58; 18 pages.

Po, et al.; "A Novel Method for Synthesizing an Automatic Matching Network and Its Control Unit;" Transactions on Circuits and Systems—I; Regular Papers; vol. 58; No. 9; Sep. 2011; pp. 2225-2236; 12 pages.

Roslaniec, et al.; "Design of Single-Switch Inverters for Variable Resistance/Load Modulation Operation;" IEEE Transactions on Power Electronics; vol. 30; No. 6; Jun. 2015; pp. 3200-3214; 15 pages.

Sokal, et al.; "Class E-A New Class of High-Efficiency Tuned Single-Ended Switching Power Amplifiers;" IEEE Journal of Solid-State Circuits: vol. SC-10; No. 3; Jun. 1975; pp. 168-176; 9 pages.

Sokal; "Class-E RF Power Amplifier;" QEX; pp. 9-20; Jan./Feb. 2001; 12 pages.

* cited by examiner

HIGH-FREQUENCY VARIABLE LOAD INVERTER AND RELATED TECHNIQUES

CROSS REFERENCE TO RELATED APPLICATION

This application claims the benefit under 35 U.S.C. § 119(e) of U.S. Provisional Application No. 62/355,414 filed Jun. 28, 2016, which application is incorporated herein by reference in its entirety.

BACKGROUND

As is known in the art, many applications, ranging from industrial plasma generation to wireless power transfer, require inverters (or power amplifiers) that can deliver power at high frequency (HF), e.g. 3-30 MHz or Very High Frequency (30-300 MHz) or above to a load circuit (or more simply, a "load"). Such applications often utilize signals having frequencies which fall with the industrial, scientific and medical (ISM) band of frequencies (e.g., 6.78 MHz, 13.56 MHz, 27.12 MHz). The loads coupled to an output of the inverter to receive HF power therefrom may often exhibit load impedances that vary over a wide range. Such impedance variations include variations in both inductive and capacitive impedance characteristics as well as resistive variations.

As is also known, addressing such applications with circuits and systems which operate at a relatively high efficiency is challenging owing to the constraints imposed by the combination of HF operation and varying impedances of loads. Inverter designs at HF generally utilize fundamental-frequency inductive loading of the inverter transistor(s) to achieve zero-voltage switching (ZVS) transitions necessary to achieve high efficiency operation. Also for efficiency reasons, it is desirable to provide only a minimum amount of inductive loading necessary to support ZVS along with the current needed to support the load. Providing HF power to a load having a highly-variable load impedance (particularly into a load impedance having variations in inductive and capacitive impedance characteristics in addition to resistive variations) makes it difficult to maintain desired inductive transistor loading without requiring a large inductive circulating current, which itself can induce substantial loss. Thus, variations in load impedances (i.e. loading variations) can directly constrain an achievable operating range and efficiency of an inverter system. Furthermore, these constraints become increasingly severe with increasing frequency and power ratings.

One approach to address load impedance variations in some applications is to augment an inverter designed for a single load impedance (e.g., 50 Ohms) with a tunable matching network (TMN) that dynamically matches the variable load impedance to the fixed value desired for the inverter. Such TMNs realize the adaptive tuning using variable passive components, such as motor-driven mechanically-variable capacitors, switched capacitor banks, or high-power varactors. This approach is very effective since it allows the inverter to operate at its designed operating point for all loads within the tuning range of the TMN. The TMNs themselves, however, are generally expensive, bulky, slow and inefficient. Thus, efficient generation and delivery of power into variable load impedances is difficult, resulting in HF inverter (or power amplifier) systems that are bulky, expensive and inefficient.

SUMMARY

Described herein are inverter system and circuit architectures and associated control techniques which allow direct delivery of high frequency (HF) power to load circuits (or more simply "loads") having impedances which vary over a wide range.

In accordance with one aspect of the concepts, systems, circuits and techniques described herein, a system comprises a pair of inverters coupled and controlled such that each inverter always has presented thereto a load impedance having a resistive/inductive characteristic with the inductive loading component limited to that necessary for supplying any reactive component of a load current while at the same time realizing zero-voltage switching (ZVS) of both inverters.

Such an approach enables power delivery systems to directly provide power into highly variable load impedances with a relatively high efficiency. The described inverter architecture and associated control approach enable efficient delivery of radio-frequency (RF) power into loads having widely varying impedances (i.e. widely variable loads) while maintaining efficient zero-voltage switching (ZVS) operation.

In accordance with a further aspect of the concepts, systems, circuits and techniques described herein, an inverter architecture and associated control approach for providing efficient delivery of HF into varying load impedances includes a first inverter having an output adapted to be directly connected to the load wherein the first inverter is coupled such that its output is coupled in series or in parallel with the load, an immittance converter, and a second inverter having an output coupled to the load through the immittance converter and wherein the immittance converter is configured to be coupled in parallel or series with the load.

With this particular arrangement, a power delivery system having an architecture which results in a region of load admittances over which the system can efficiently operate within inverter constraints as a function of output power is provided. The inverter system further includes a controller coupled to provide control signals to the first and second inverters such that a capacitive susceptive portion of a load current is substantially provided by the second inverter via the immittance converter, and an inductive susceptive portion of a load current is substantially provided by the first inverter. In embodiments, the systems, circuits and techniques provide efficient delivery of HF into variable load impedances while maintaining resistive/inductive loading of the constituent inverters for ZVS soft switching.

In accordance with a further aspect of the concepts, systems, circuits and techniques described herein, a control method includes setting in-phase and quadrature phase components of first and second inverters to achieve a desired output power and inverter loading characteristics. By controlling in-phase (I) and quadrature (Q) components of a voltage common as provided to first and second inverters the I/Q representation carries the same information as the magnitudes and phases of the inverter voltages and defining the I/Q relationships such that the quadrature component for each inverter leads its in-phase component by 90° and the in-phase component of the second inverter leads that of the first inverter by 90°. The in-phase component of the first inverter ($V_{AI}$) may be arbitrarily defined to be the desired output voltage phase reference such that the voltage of the first inverter is defined by its in-phase component and has zero quadrature component ($V_{AQ}=0$). The in-phase component of the second inverter ($V_{BI}$) may be defined as leading the in-phase component of the first inverter by 90°. Thus, in terms of phasors. $V_A = V_{AI}$ and $V_B = -V_{BQ} + jV_{BI}$.

With this particular arrangement, a control technique which achieves output control goals (i.e. delivering a specified output power while preserving desired inverter loading characteristics) for loads within an achievable range is provided.

The architecture and techniques described herein result in a relatively compact, cost effective circuit which enables efficient generation of HF power for applications in which load admittance varies over a wide range.

In accordance with the concepts, systems, circuits and techniques described herein, an inverter system capable of dynamically adjusting to impedance variations of a load coupled to an output thereof, the inverter system comprising a pair of inverters and an immittance converter.

With this particular arrangement, an HF inverter which can directly operate efficiently across a wide range of load impedances is provided. That is, the inverter may be directly coupled to a load (i.e. without a TMN coupled between the inverter and the load) to dynamically adjust to variations in a load impedance thereby resulting in a system having a relatively high efficiency compared with efficiencies achieved using prior art approaches.

In embodiments, the pair of inverters may be provided as a pair of HF zero voltage switching (ZVS) inverters. By interconnecting the ZVS inverters with an immittance converter and a load network, the amplitudes and relative phases of the inverters may be controlled to: modulate output power; and realize inductive/resistive loading of both inverters for ZVS soft switching under both capacitive and inductive loading.

In embodiments, an HF inverter provided in accordance with the architecture described herein may directly drive and control power into a wide range of load impedances at HF and VHF frequencies (e.g. in the 3-300 MHz frequency range). Furthermore, an HF inverter provided in accordance with the architecture described herein may maintain resistive/inductive loading of the inverters for ZVS soft switching while directly driving and controlling power into a wide range of load impedances.

In embodiments, high-frequency inverters for some applications operate with variable resistive/inductive loading. In such applications, ZVS Class D or DE inverters are suitable and the inverter system may include an optional inductive preload circuit to enable ZVS with pure resistive loading.

In embodiments, high-frequency inverters for some application operate with variable resistive/inductive loading. Variable-load Class E inverters are also suitable since variable-load class E inverters work well under both inductive and variable resistive loading.

In accordance with a further aspect of the concepts, systems, circuits and techniques described herein, a method for providing efficient delivery of high frequency (HF) power into a load having a variable load impedance includes (a) controlling a first inverter to achieve a desired radio frequency (RF) power level at an RF output thereof; and (b) controlling a second inverter such that the second inverter drives substantially any capacitive component of the first inverter loading to substantially zero, and a quadrature-phase component of a voltage command provided to the second inverter becomes zero when the load is inductive such that the second inverter delivers a real component of the output power having an amplitude within its voltage rating while concurrently maintaining an in-phase current sourced by the first inverter to be substantially zero or positive such that the first and second inverters have presented thereto a load impedance having a resistive/inductive characteristic.

BRIEF DESCRIPTION OF THE DRAWINGS

The foregoing features may be more fully understood from the following description of the drawings in which.

DETAILED DESCRIPTION

In general overview, described is a new architecture for HF variable-load inverters which Incorporates two ZVS soft-switched HF inverters and an immittance converter. The amplitudes and phases of inverters can be controlled so as to enable delivery of RF power into a wide range of varying load impedances (both capacitive and inductive loads) while maintaining resistive/inductive loading of the inverters for ZVS soft switching.

The concepts, systems, circuits and techniques described herein find use in a wide variety of applications requiring power in the HF (3-30 MHz) or VHF (30 MHz-300 MHz) frequency ranges. In general, concepts, systems, circuits and techniques described herein may find use in any application in which RF energy must be delivered to a load having a wide range of load impedances (i.e. the impedance characteristic of the load dynamically varies (i.e. changes while the system is operating). Such applications include, but are not limited to plasma generation, induction heating, wireless power, magnetic resonance imaging (MRI) applications. Some applications may be narrow-band (e.g., ISM band 6.78 MHz, 13.56 MHz, 27.12 MHz).

Figure 1A:
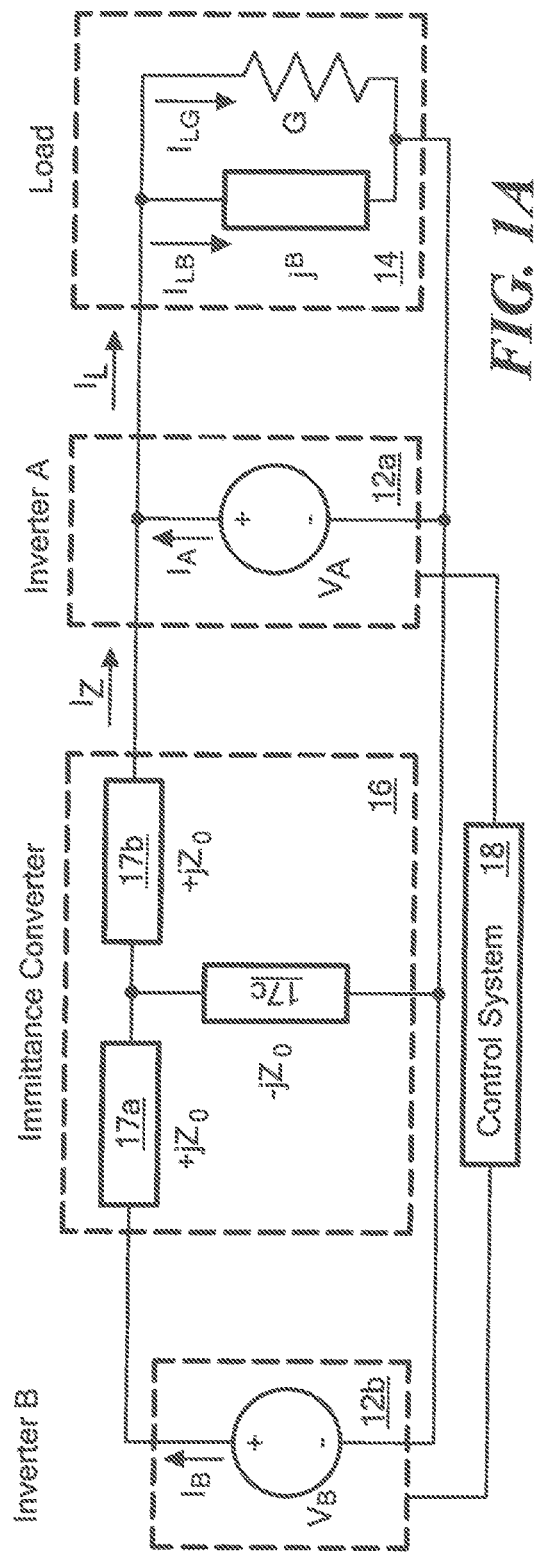
FIG. 1A is a block diagram of a variable load inverter.

Referring now to FIG. 1A, an inverter system 10 for delivering power at high frequency (HF) e.g. frequencies in the range of 3 MHz-30 MHz comprises a pair of inverters 12a, 12b, (e.g. switched mode inverters) with a first one of the inverters 12a directly coupled to a load 14 and a second one of the inverters 12b coupled to the load 14 via an immittance converter 16. Immittance converter 16 is here illustrated as a T network provided from lumped components. Those of ordinary skill in the art will appreciate, of course, that immittance converter 16 may also be provided from a distributed circuit such as a quarter-wave transmission line section or from a combination of lumped and distributed circuit components.

For reasons which will become apparent from the description hereinbelow, the inverter system also comprises a controller coupled to provide control signals to the first and second inverters, to dynamically vary at least one of bias input voltages and/or ac output voltages and relative switching phases of the first and second inverters 12a, 12b so as to control the delivery of HF power to the load 14.

Thus, as illustrated in FIG. 1A, the two HF ZVS inverters 12a, 12b, are interconnected with immittance converter 16 and load network 14 and the amplitudes and relative phases of the inverters may be controlled to modulate output power and realize inductive/resistive loading of both inverters for ZVS soft switching under both capacitive and inductive loading.

Figure 1B:
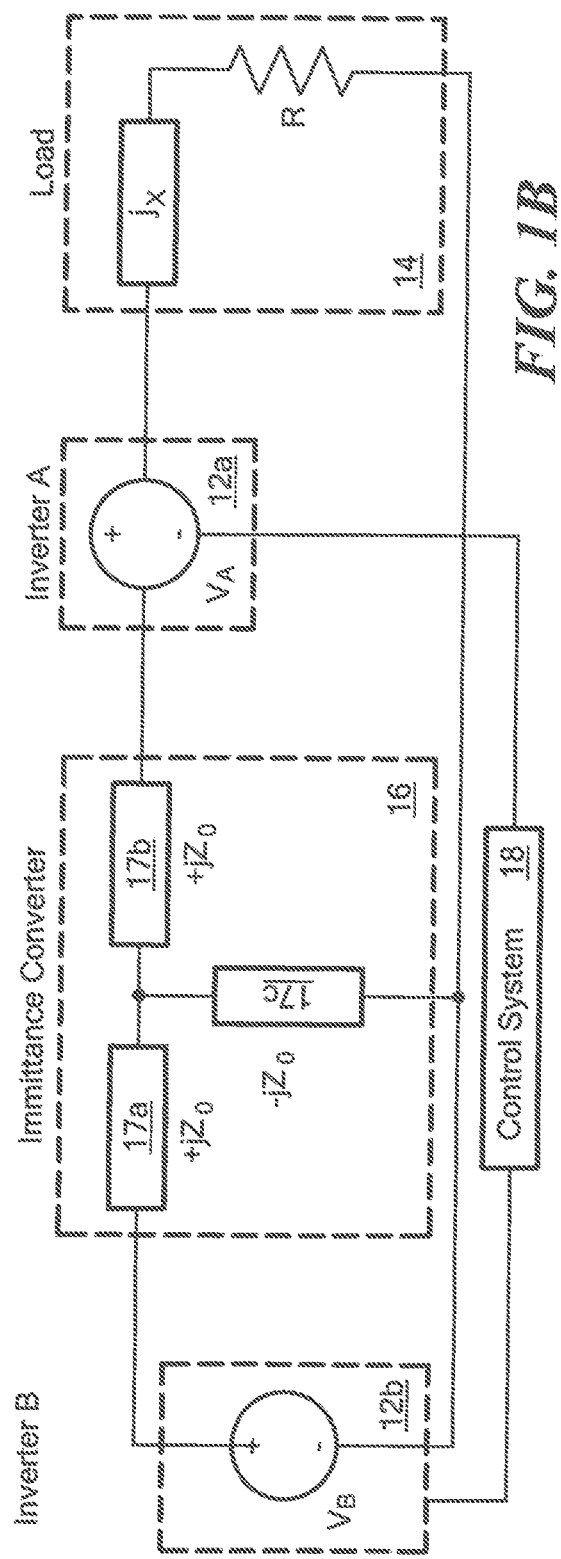
FIG. 1B is a block diagram of an alternate embodiment of a variable load inverter.

Referring briefly to FIG. 1B, in which like elements of FIG. 1A are provided having like reference designations, a variant of the system described in FIG. 1A is shown. It should be appreciated that the alternative embodiment of FIG. 1B can be used to provide the same advantages as the embodiment of FIG. 1A in terms of inverter loading. It should also be appreciated that in the embodiment of FIG. 1B, the location of inverter 12a and the load may be exchanged to make the inverter ground referenced.

One difference between the embodiments of FIGS. 1A and 1B is that the architecture of the system illustrated in FIG. 1A is more suitable for supplying loads requiring large transient currents at limited voltage, while systems having the architecture illustrated in FIG. 1B are advantageous for supplying loads requiring large transient voltages at limited current. In either case, however, one inverter (i.e. inverter 12a in the illustrative embodiments) is directly connected to the load (with an output in series or parallel with the load), while the other inverter (i.e. inverter 12b) is coupled to the load via an immittance converter (with one port of the immittance converter in parallel or series with the load).

Referring again to FIG. 1A, for modeling purposes and to explain the operation of the proposed architecture, the inverters are treated as ideal ac voltage sources having controllable amplitude and phase. In practice, one can utilize any type of inverter suitable for HF operation under resistive/inductive loading, and amplitude control of the individual inverters can be realized through any suitable means (e.g., supply voltage modulation, phase-shift or outphasing control, pulse-width modulation, etc.).

The immittance converter 16 serves to losslessly transform the voltage (current) delivered by inverter 12b at the first port of the immittance converter into an appropriately-scaled and phase-shifted current (voltage) at the second port of the immittance converter and vice versa, according to the following rule:

$$\begin{bmatrix} V_A \\ I_Z \end{bmatrix} = \begin{bmatrix} 0 & -j \cdot Z_0 \\ \frac{-j}{Z_0} & 0 \end{bmatrix} \cdot \begin{bmatrix} V_B \\ I_B \end{bmatrix} \quad (1)$$

An immittance converter is thus a two-port lossless, reciprocal network that swaps between voltages and currents at its ports (with a 90° delay). For example, a quarter-wave transmission line is an immittance converter. Also, many lumped circuit implementations of an immittance converter are available. An immittance converter "inverts" impedances—e.g. an Impedance $Z_L$ on one port is presented as (looks like) an impedance value of $Z_0^2/Z_L$ at the other port.

Thus, immittance converter 16 has a characteristic such that the immittance converter swaps voltages and currents between its ports, consequently transforming between capacitive and inductive impedances. Such a characteristic is important to the operation of a power delivery system having the proposed architectures described herein. In practice, the immittance converter can be realized with a variety of passive lumped networks and at sufficiently high frequencies can be realized with a quarter-wave transmission line. Immittance converter 16 may, for example, be the same as or similar to the type described in (M. Borage, K. V. Nagesh, M. S. Bhatia and S. Tiwari, "Resonant Immittance Converter Topologies," IEEE Transactions on Industrial Electronics, Vol. 58, No. 3, pp. 971-978, March 2011).

The amplitudes and relative phase of the two inverters 12a, 12b are used to control both the total output power and the effective loading admittance presented at the ports of each of the two inverters. It should be appreciated that as used herein the phrase "effective loading admittance," refers to the complex ratio of current to voltage at an inverter output port with both inverters active. In particular, the relative phases and amplitudes of inverters 12a, 12b are controlled in a manner such that each inverter 12a, 12b are presented a resistive/inductive effective load regardless of the nature of the actual system load, facilitating zero-voltage switching (ZVS) of the inverters.

With reference to prior art systems, it is noted that a classical Doherty rf power amplifier utilizes an immittance converter to combine power from two sources into a single output and has an architecture which provides in-phase combining of power from linear power amplifiers into a specified resistive load (yielding resistive load modulation of the amplifiers).

The present architecture, on the other hand, utilizes both amplitude and phase shift control among switched-mode inverters to achieve both power control and desirable resistive/inductive loading of the constituent inverters across a wide range of load impedances.

For simplicity of explanation, inverter controlled is explained in terms of the conductive and susceptive components of the load admittance.

Which inverter supplies the susceptive component of the load current depends upon whether the susceptive component is inductive or capacitive. In the case where the load is inductive, the susceptive portion of the load current $I_{LB}$ is provided by inverter 12a, while the conductive portion of the load current $I_{LG}$ is split between inverters 12a, 12b.

In contrast, when the load is capacitive, the susceptive portion of the load current $I_{LB}$ is provided by inverter 12b (after processing through the immittance converter), while the conductive portion of the load current $I_{LG}$ is split between inverters 12a, 12b. In each case, the relative phases of inverters 12a, 12b can also be set to ensure a degree of inductive loading for each inverter to provide soft switching we treat each of these cases in turn.

Figure 2:
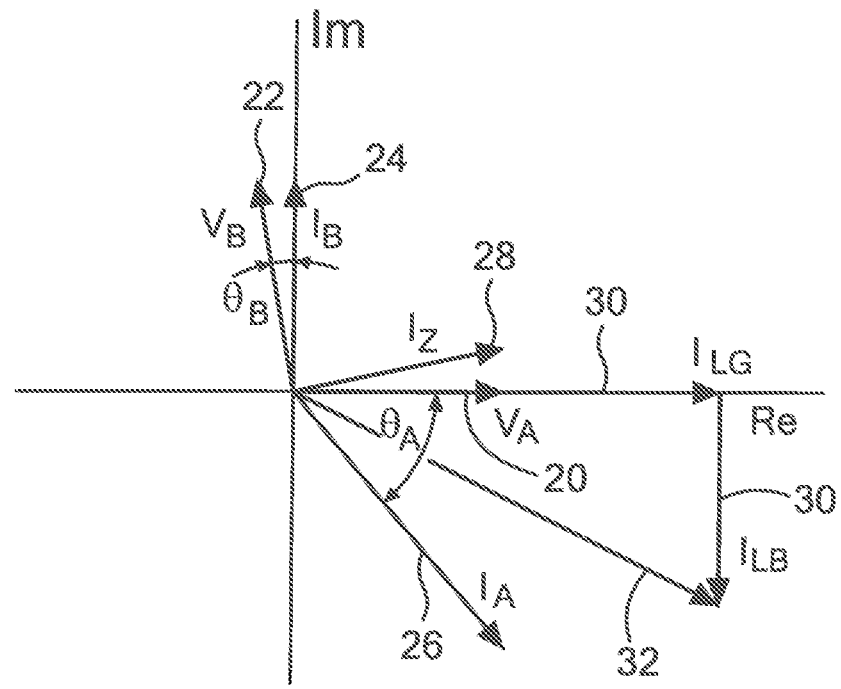
FIG. 2 is a phasor diagram illustrating voltage and current relationships in the network of FIG. 1A for a load having inductive susceptance.
Figure 3:
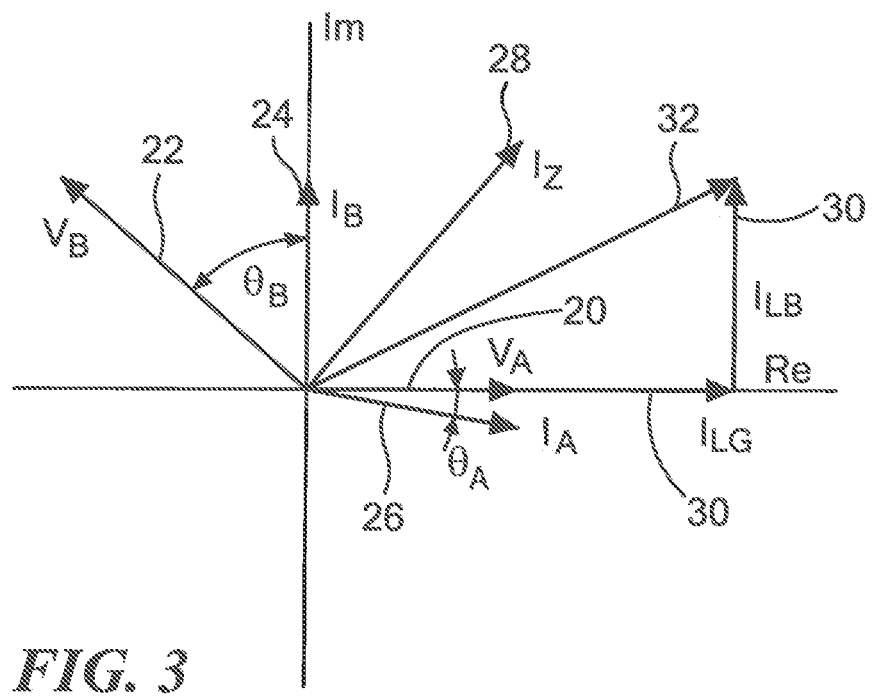
FIG. 3 is a phasor diagram illustrating voltage and current relationships in the network of FIG. 1B for a load having capacitive susceptance.

To further explain the broad concepts sought to be protected herein, and with reference to FIGS. 2 and 3, consider an inductive/resistive load as illustrated by the phasor relationship of FIG. 2 and only use of inverter 12a. In this case, inverter 12a is inductively loaded (for ZVS). Next, with reference to FIG. 3, consider a capacitive/resistive load and only use of inverter 12b. Through action of the immittance converter 16, the capacitive/resistive load appears as an inductive/resistive load to Inverter 12b. Thus, inverter 12b is also is inductively loaded (for ZVS).

Consider next the interaction of the two inverters (neglecting load). With appropriate phasing between components of $V_A$, $V_B$, both inverters see an inductive loading component owing to the action of the immittance converter. This provides reactive currents facilitating ZVS switching of both inverters. Thus, operated together, inverter 12a supplies reactive current for inductive loads and inverter 12b supplies reactive current for capacitive loads while one or both inverters may deliver real power. Thus, the two inverters 12a, 12b can cover a wide load admittance range with inductive loading (for ZVS) of both inverters.

Referring now to FIG. 2, as noted above, a phasor relationship for the example where a load (e.g. load 14 in FIG. 1A) is conductive/inductive is shown. The load voltage may be directly set by the voltage of inverter 12a, with amplitude $V_A$ (as identified by reference numeral 20) set to a level sufficient to drive the desired average load power. It should be noted that a zero-phase reference for voltage $V_A$ is arbitrarily assumed. The phase of inverter 12b voltage $V_B$ is set to an angle ($\theta_B$+90°) ahead of the phase of inverter 12a voltage $V_A$ owing to the action of the immittance converter 16, the current $I_B$ lags $V_B$ by $\theta_B$, providing a degree of inductive loading for inverter 12b. Angle $\theta_A$ is selected to be as small as possible commensurate with providing both inverters 12a, 12b, with desirable operating waveforms (e.g. waveforms which provide sufficient inductive currents to each inverter for ZVS switching.)

In the case where the inverters 12a, 12b are designed such that they can achieve ZVS with a purely resistive load, $\theta_B$ can be set to zero. Owing to the action of the immittance converter 16, current $I_Z$ leads $V_A$ by $\theta_B$. The amplitude $V_B$ is selected such that the sum of the real components of $I_Z$ and $I_A$ are sufficient to support the necessary load conductance current $I_{LG}$. The imaginary component of $I_A$ is negative, representing the difference between the susceptive component of the load current $I_{LB}$ and the imaginary component of current $I_Z$. $I_A$ thus lags $V_A$, providing inverter 12a with a degree of inductive loading.

The detailed achievable operating range is described below, however, FIG. 2 illustrates that for any conductive or conductive/inductive load admittance, each of the two inverters 12a, 12b can be provided with desirable loading conditions (e.g., for ZVS soft switching).

Referring now to FIG. 3, as noted above, a phasor diagram illustrates an example in which a load is conductive/capacitive. As described above in conjunction with FIG. 2, the load voltage and output power are again set by the voltage of inverter 12a and the phase of inverter 12b voltage $V_B$ is likewise set to an angle ($\theta_B$+90°) ahead of $V_A$. In this case, however, the phase $\theta_B$ is selected in conjunction with the amplitude of $V_B$ such that the imaginary component of related current $I_Z$ provides the susceptive portion of the load current $I_{LB}$ along with any necessary additional current to enable soft switching of the two inverters.

Owing to this additional (imaginary axis) current, the phase of current $I_A$ lags $V_A$ by a small amount ($\theta_A$), thereby providing an inductive loading component to inverter 12a. For an inverter which is preloaded for ZVS soft switching under resistive load, $\theta_A$ can be zero, while without preloading, $\theta_A$ can be just sufficiently large in conjunction with the amplitude of $I_A$ that the resulting susceptive component of $I_A$ suffices to realize a voltage transition for zero-voltage switching.

Likewise, phase $\theta_B$ provides a sufficient inductive loading component for inverter 12b. If the inverters 12a, 12b, are designed to achieve desired operation into a resistive load, phase $\theta_B$ can be selected such that $\theta_A$ is zero, making current $I_A$ in phase with $V_A$).

As can be seen from FIGS. 2 and 3, by utilizing the appropriate controls, loads with either capacitive or inductive susceptive components can be supplied with the proposed system while maintaining resistive/inductive loading of each inverter (e.g., for ZVS soft switching). A more detailed control strategy by which the above goals can be realized is described below.

Of interest in the proposed architecture is the achievable load admittance range that can be driven as a function of inverter VA rating and specified output power. In the example provided herein, focus is placed on the symmetric case in which the two inverters 12a, 12b are substantially identical, each with an ac output current amplitude rating Wand ac output voltage amplitude rating $V_M$ and with characteristic impedance of the immittance converter of $Z_0=V_M/I_M=1/Y_0$. Each inverter 12a, 12b thus has an ideal rated output power of $P_{r,i}=\frac{1}{2} \cdot V_M I_M$, though this output power is only achievable into a single effective load impedance. Consequently, the system 10 is typically operated at a power level which is well below $P_{r,i}$.

Described below is an analytical treatment of the range of load admittances that can be driven within inverter operating limits as a function of the desired output power (normalized to the power rating of a single inverter $P_{r,i}$). The analysis starts by establishing the load conductance range over which a single inverter can drive a desired average power P assuming zero susceptance. Equations 2 and 3 show the required load voltage amplitude [$V_{OUT}$, equal to $V_A$ in FIG. 1A] and conductive load current amplitude [$I_L$] necessary to drive power P as a function of conductance G.

$$|V_{OUT}| = \frac{\sqrt{2P}}{\sqrt{G}} \tag{2}$$

$$|I_G| = \sqrt{2P} \cdot \sqrt{G} \tag{3}$$

Figure 4:
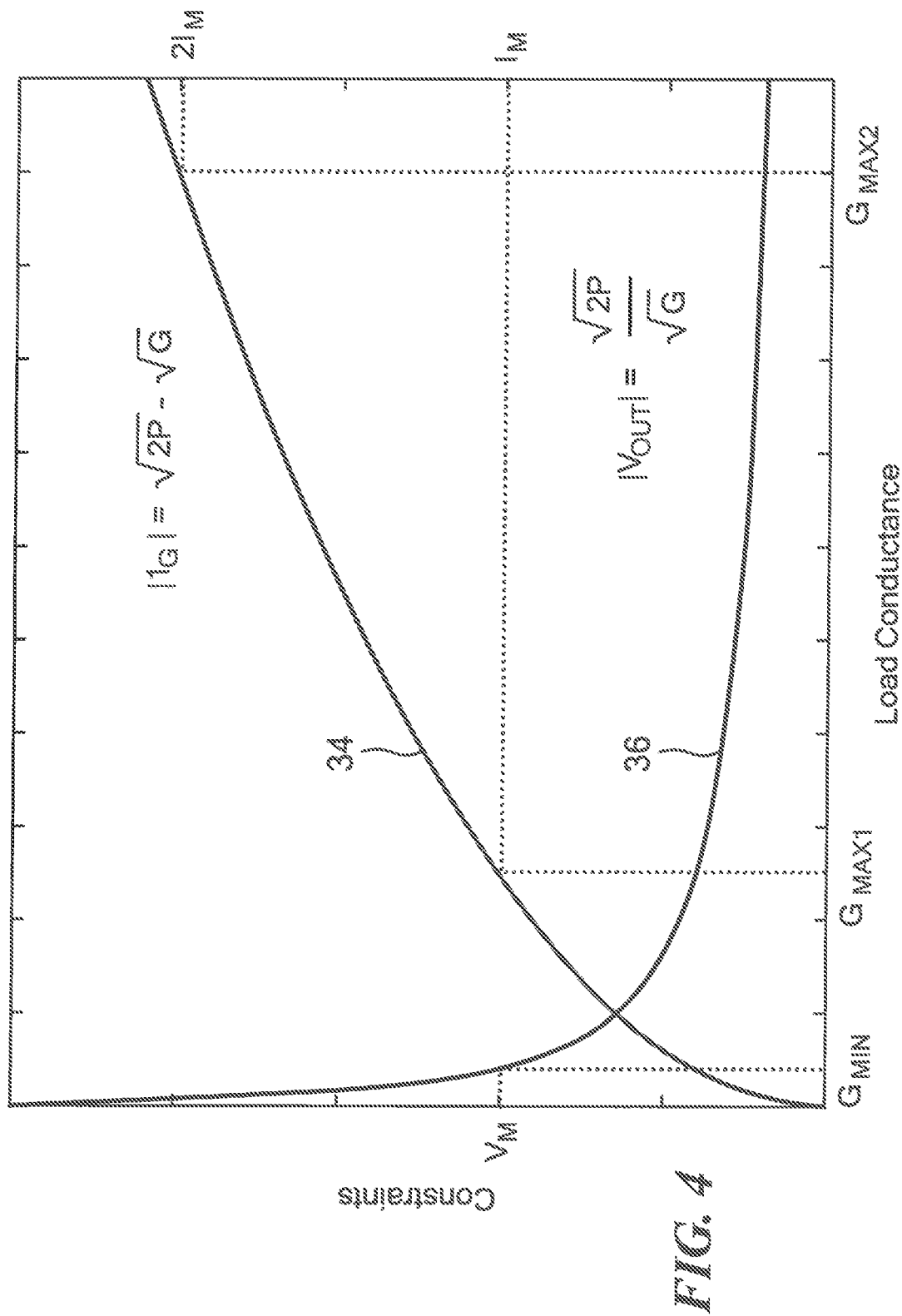
FIG. 4 is a plot of constraints vs. load conductance which illustrates voltage and current constraints determining allowable inverter operating range as a function of load conductance.

Referring now to FIG. 4, the above relationships are illustrated along with constraints on inverter voltage and current, with curve 34 corresponding to the current constraint and curve 36 corresponding to the voltage constraints. $G_{MIN}$ denotes the minimum load conductance for which power P can be delivered within the specified inverter voltage rating $V_M$. For lower conductances, power P cannot be delivered without exceeding the inverter voltage limit. Similarly, $G_{MAX1}$ is the maximum load conductance for which a single inverter can deliver sufficient current to drive power P within inverter current rating $I_M$. Given that two inverters are available to deliver power, there is an extended load conductance range over which a specified power P could be delivered by the system. $G_{MAX2}$ shows the maximum conductance for which both inverters operating together (e.g. inverters 12a, 12b) could deliver the current required to provide power P (at zero susceptance). These load conductance values can be found to be $$G_{MIN} = \frac{2P}{V_M^2} \quad G_{MAX1} = \frac{I_M^2}{2P} \quad G_{MAX2} = 4\frac{I_M^2}{2P} \quad (4)$$

The real part of the load admittance range that can be supported is defined by $G_{MIN}$, $G_{MAX1}$, $G_{MAX2}$. To find the complete admittance range that is supportable, first consider the typical case of power levels $P \leq P_{r,i}$ for which $G_{MIN} \leq G_{MAX1} < G_{MAX2}$. For operation between $G_{MIN}$ and $G_{MAX1}$, the system is not constrained by voltage, and the real (conductive portion) of load current can be completely supported by one of the two inverters. This leaves the second inverter to support the susceptive portion of load current up to its maximum rated current $I_M$. Based on the current delivery constraint of the second inverter, the necessary current can be provided for susceptances having magnitudes up to a value $B_{MAX}$:

$$|B_{MAX}| = \frac{I_M}{\sqrt{2P}} \cdot \sqrt{G} \quad (5)$$

At $G_{MIN}$, $|B_{MAX}| = Y_0 = 1/Z_0$.

Operating between $G_{MAX}$ and $G_{MAX2}$, current contributions from both inverters are needed to support the conductive component of the load current. This leaves a portion of current from one of the inverters remaining to support susceptive load components, which may be shown to yield a maximum susceptance amplitude for this range of conductances:

$$|B_{MAX}| = \sqrt{\frac{G}{2P} \cdot (2I_M \sqrt{2PG} - 2PG)} \quad (6)$$

Figure 5:
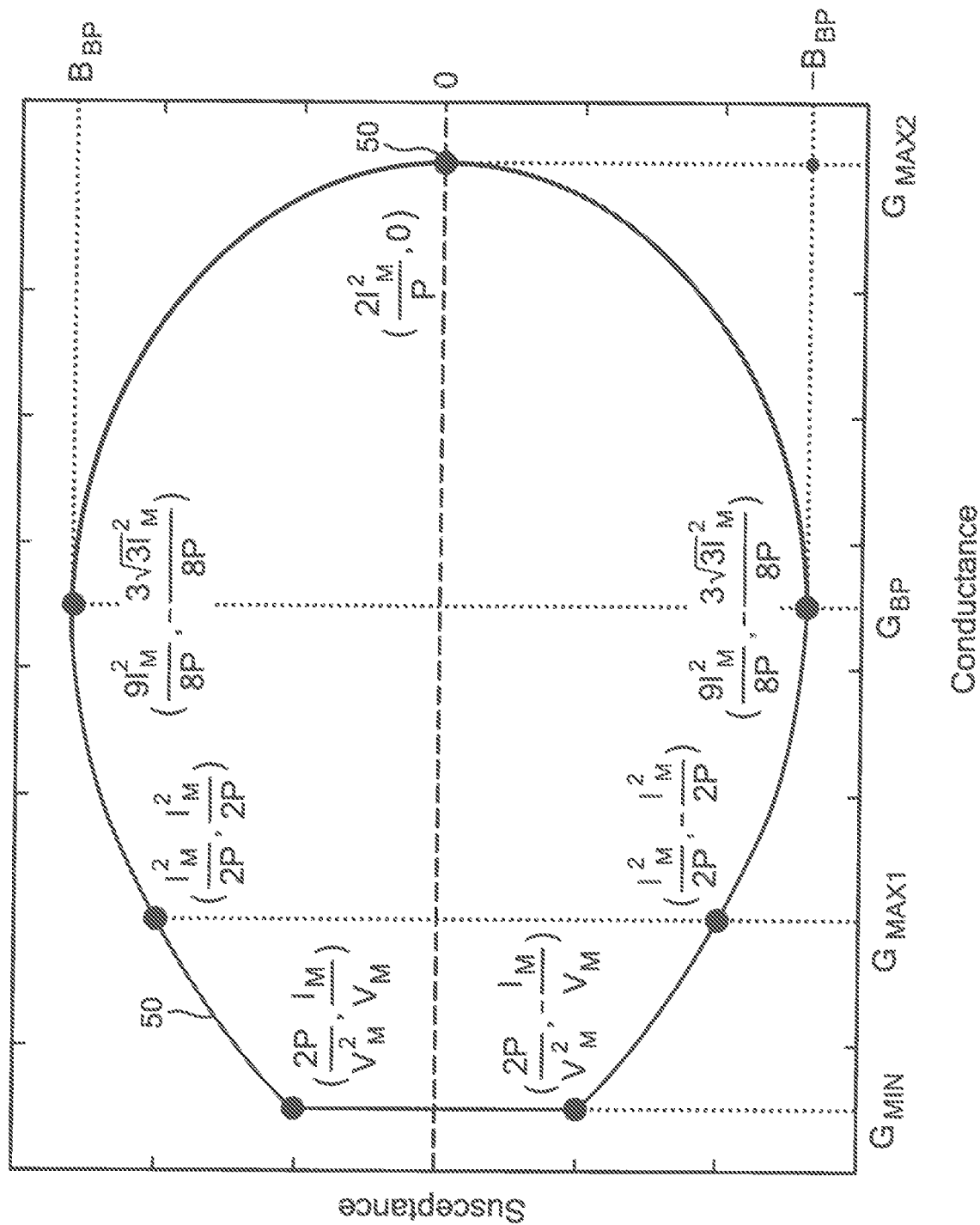
FIG. 5 is a plot of susceptance vs. conductance which illustrates the region of the load admittance plane that can be driven by the systems of FIGS. 1A, 1B for resistive/inductive loading of each inverter an assuming an output power of level $P \leq P_{r,i}$.

Referring now to FIG. 5, a plot of susceptance vs. conductance which illustrates a region of a load admittance plane that can be driven by the systems having an architecture in accordance with the concepts described herein for resistive/inductive loading of each inverter (assuming an output power level of $P \leq P_{r,i}$) is shown (i.e. FIG. 5 illustrates a load admittance range at power P within an inverter ac output voltage and having current ratings $V_M$ and $I_M$).

As can be seen from FIG. 5 when load conductance G reaches $G_{MAX2}$, all available current is being delivered to the load conductance, and the achievable susceptance is zero as indicated by reference numeral 50.

To further delineate the achievable operating range, the largest susceptance magnitude that can be driven while providing power P to the load conductance is found. This susceptance magnitude is denoted as $B_{BP}$, and the load conductance (between $G_{MAX1}$ and $G_{MAX2}$) at which this peak susceptive drive capability is reached as $G_{BP}$. Differentiating Equation (6) with respect to G and setting this derivative to zero yields:

$$B_{BP} = \frac{3\sqrt{3I_M^2}}{8P} \quad G_{BP} = \frac{9I_M^2}{8P} \quad (7)$$

This boundary result is likewise indicated in FIG. 5.

It will be appreciated that the range of load admittances that can be driven is a function of an average power P, with lower power corresponding to a wider region of admittances.

Figure 6:
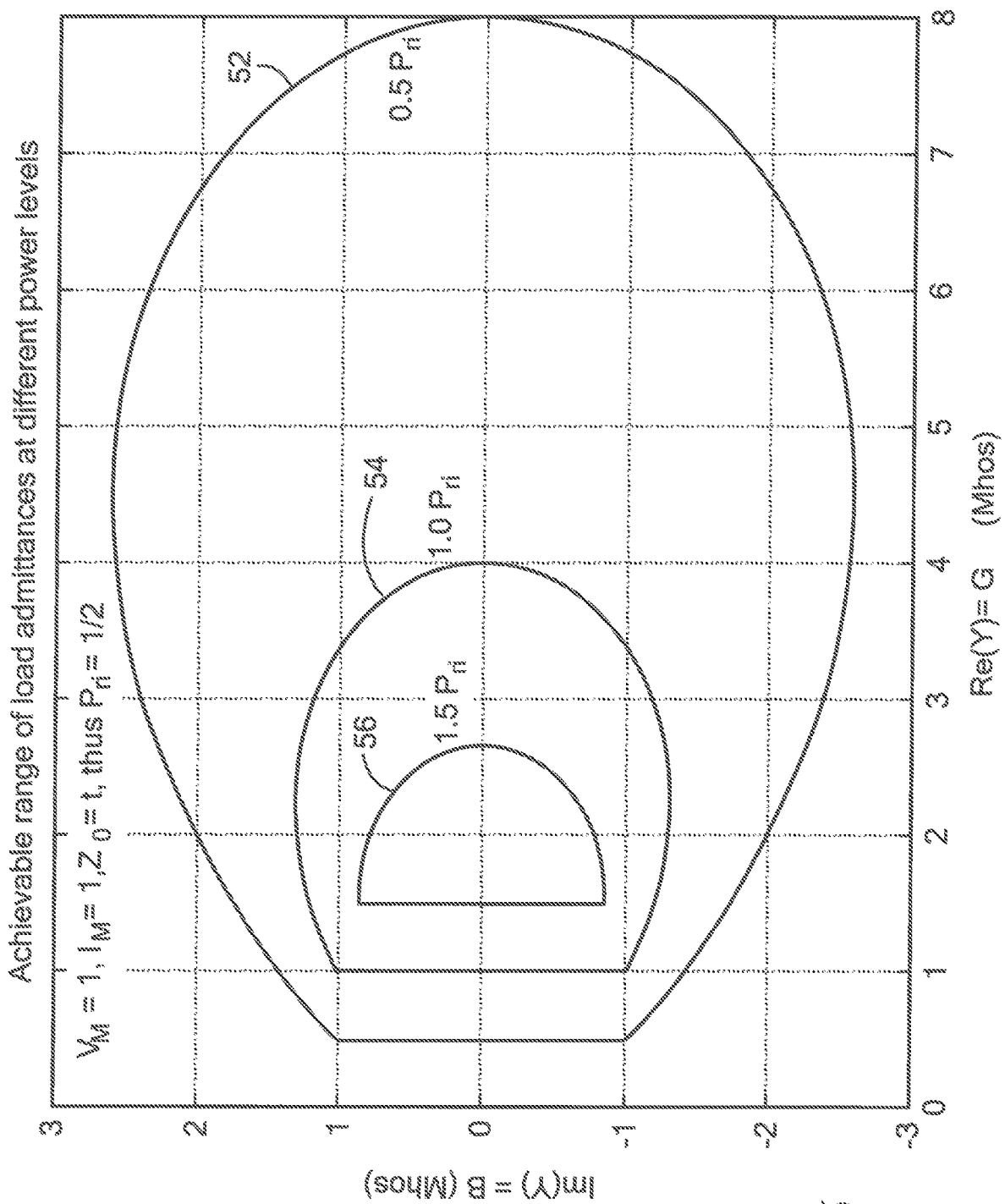
FIG. 6 is a plot of imaginary vs. real components of load admittance.

Referring now to FIG. 6, a plot of imaginary vs. real components of load admittance illustrates a region of the load admittance plane that can be driven by a system provided in accordance with the concepts described herein for different normalized output power levels. The achievable operating range of load admittances that can be driven (normalized to a characteristic admittance $Y_0=1$), is illustrated for specified output powers of 0.5 (curve 52), 1 (curve 54) and 1.5 (curve 56) times $P_{r,i}$ (i.e. FIG. 6 illustrates an achievable range of load admittances at different power levels—$1.5P_{r,i}$, $1.0P_{r,i}$, $0.5P_{r,i}$).

From curves 52, 54, 56, it can be seen that the load admittance range that can be driven increases rapidly with reductions in commanded power (or, equivalently, with increases in the volt-ampere ratings of the inverters relative to a desired output power). Thus, from FIG. 6 it can be thus be appreciated that to enable operation over a wide range of load admittances, one may oversize the VA ratings of the inverters.

The boundaries of the operating region are directly linked to inverter constraints. For example, the vertical boundary of a minimum load conductance directly expresses the voltage output limit of inverter 12a and current output limit of inverter 12b, while the boundaries to the right reflect complementary constraints.

At power levels below $P_{r,i}$ $G_{MIN} < G_{MAX1}$, the region is delineated just as illustrated in FIG. 5, with the area encompassed diminishing as P increases at $P = P_{r,i}$, $G_{MIN} = G_{MAX1}$, while for higher values of P, $G_{MIN} > G_{MAX1}$, such that the inverter voltage limit increasingly constrains the achievable admittance region. The area of allowable admittances continues to decrease with increasing power collapsing to a single point $Y = 2Y_0$ at $P = 2P_{r,i}$.

Figure 7:
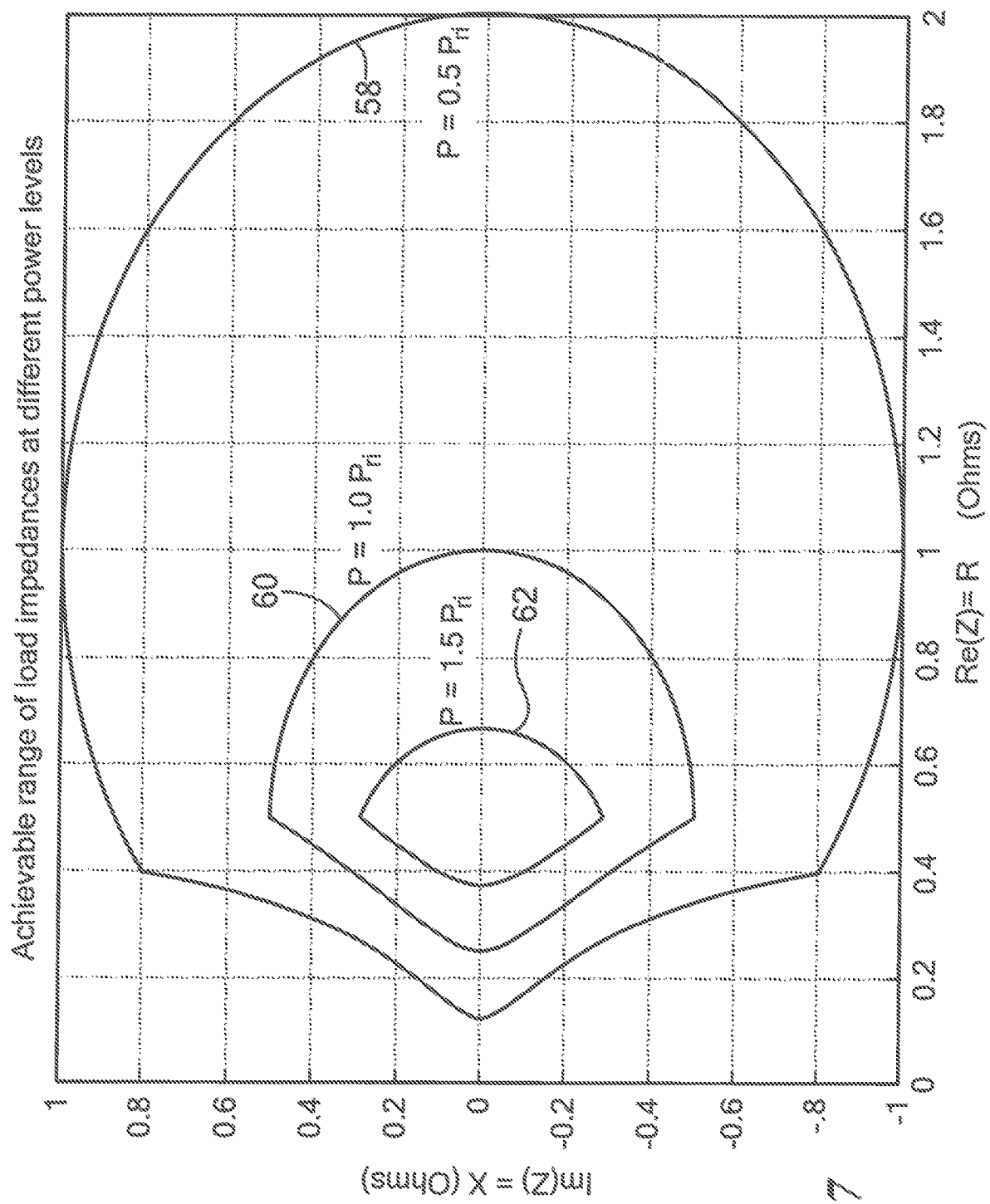
FIG. 7 is a plot of imaginary vs. real components of load admittance.

Referring now to FIG. 7, a plot of imaginary vs. real components of load admittance illustrates regions of a load impedance plane that can be driven by a system provided in accordance with the concepts described herein for different normalized output power levels. It should be noted that the same constraints on allowable load range as a function of power described above can be expressed as regions of the load impedance plane. Results are shown normalized to a characteristic impedance $Z_0=1$. It should be appreciated that the curves of FIG. 7 reflect the same operating boundaries as FIG. 6.

Figure 8:
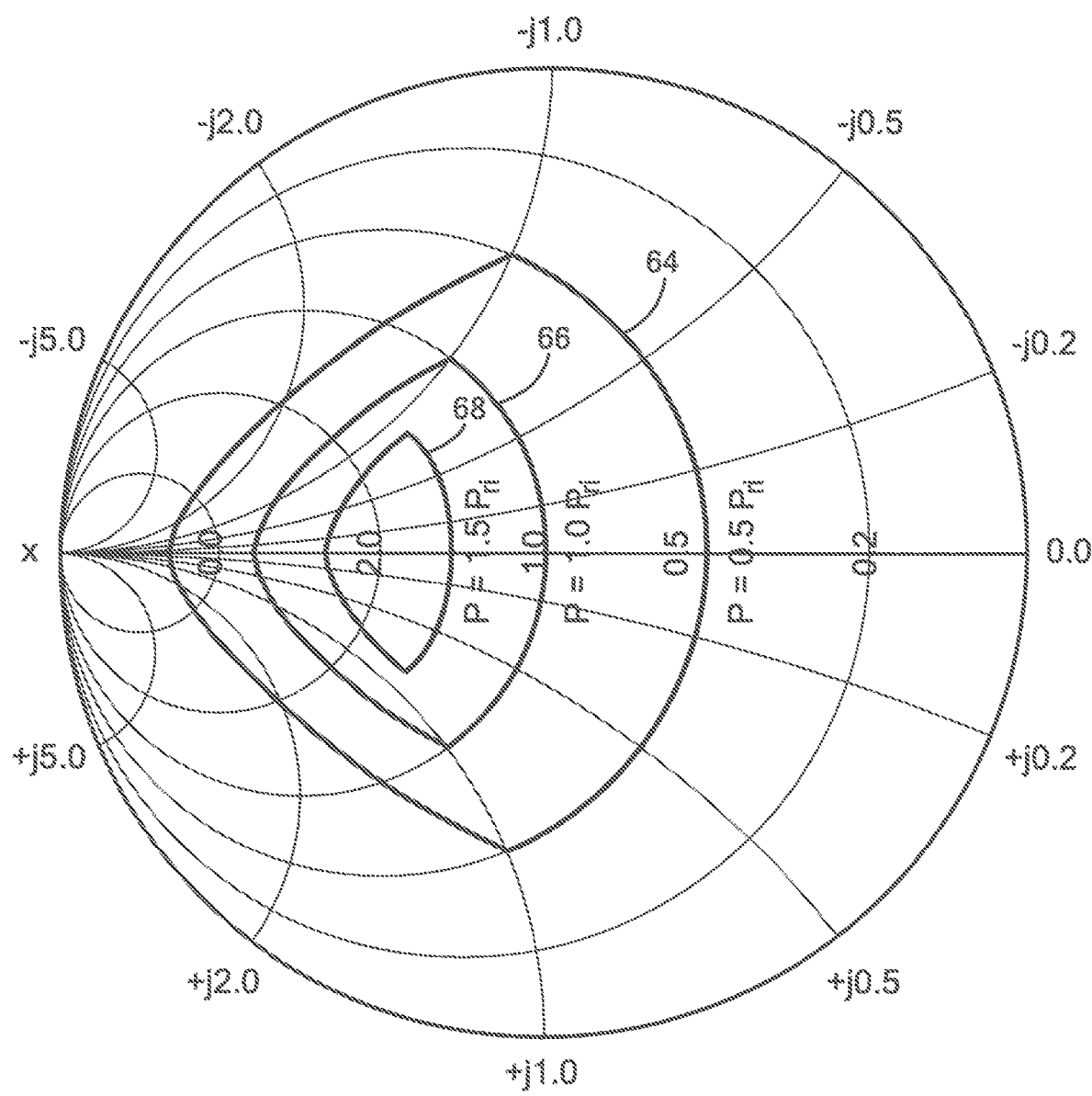
FIG. 8 is a Smith chart which illustrates achievable operating ranges for the system of FIG. 1A for different normalized output power levels (illustrating reflectance and admittance)
Figures 9A, 9B, 9C:
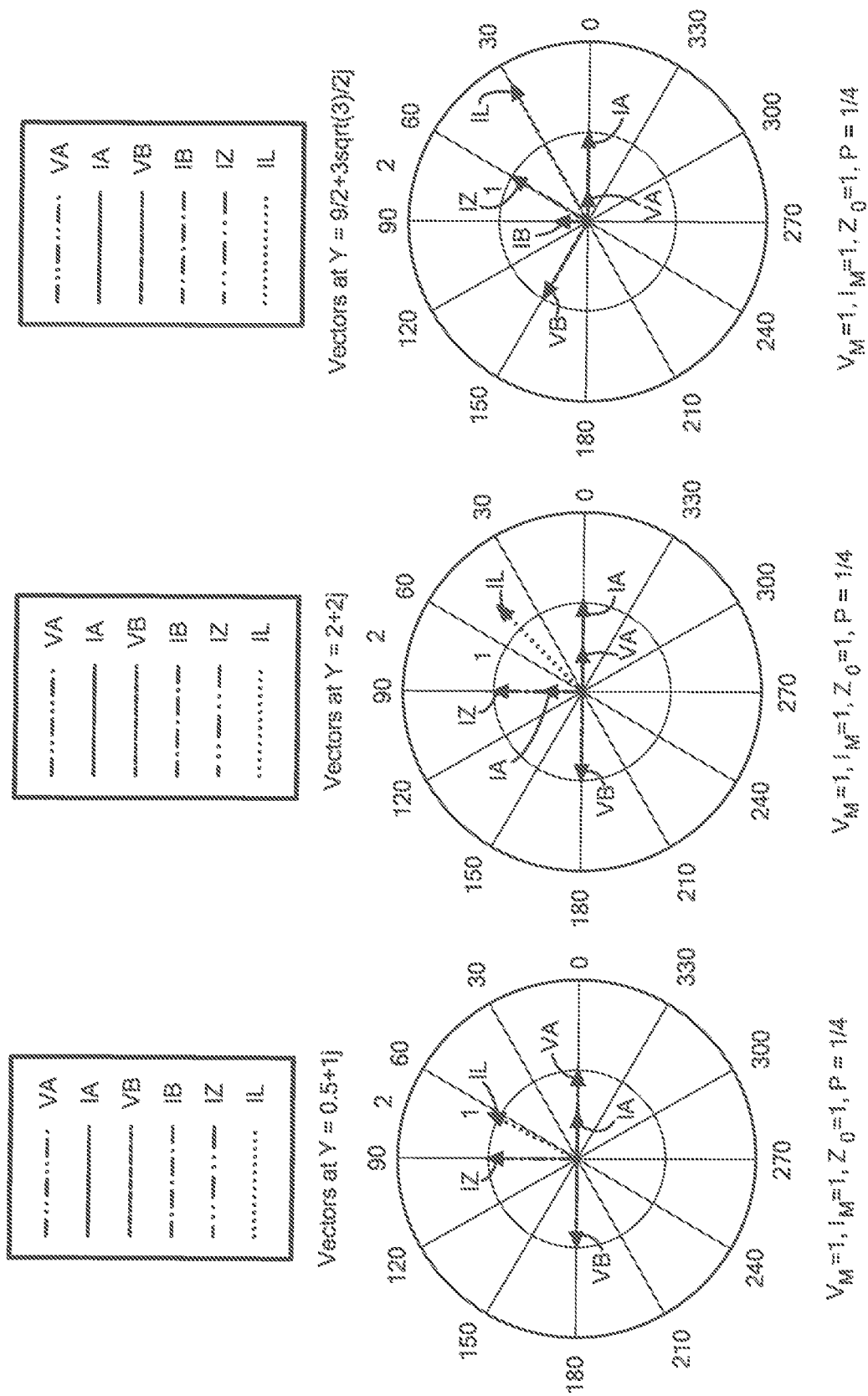
FIGS. 9A-9F are a series of phasor representations of system voltages and currents for different load admittances with $V_M=1$, $I_M=1$, $Z_0=1$ and $P=0.5$ $P_{r,i}=025$ using the control approach specified in Table I.
Figures 9D, 9E, 9F:
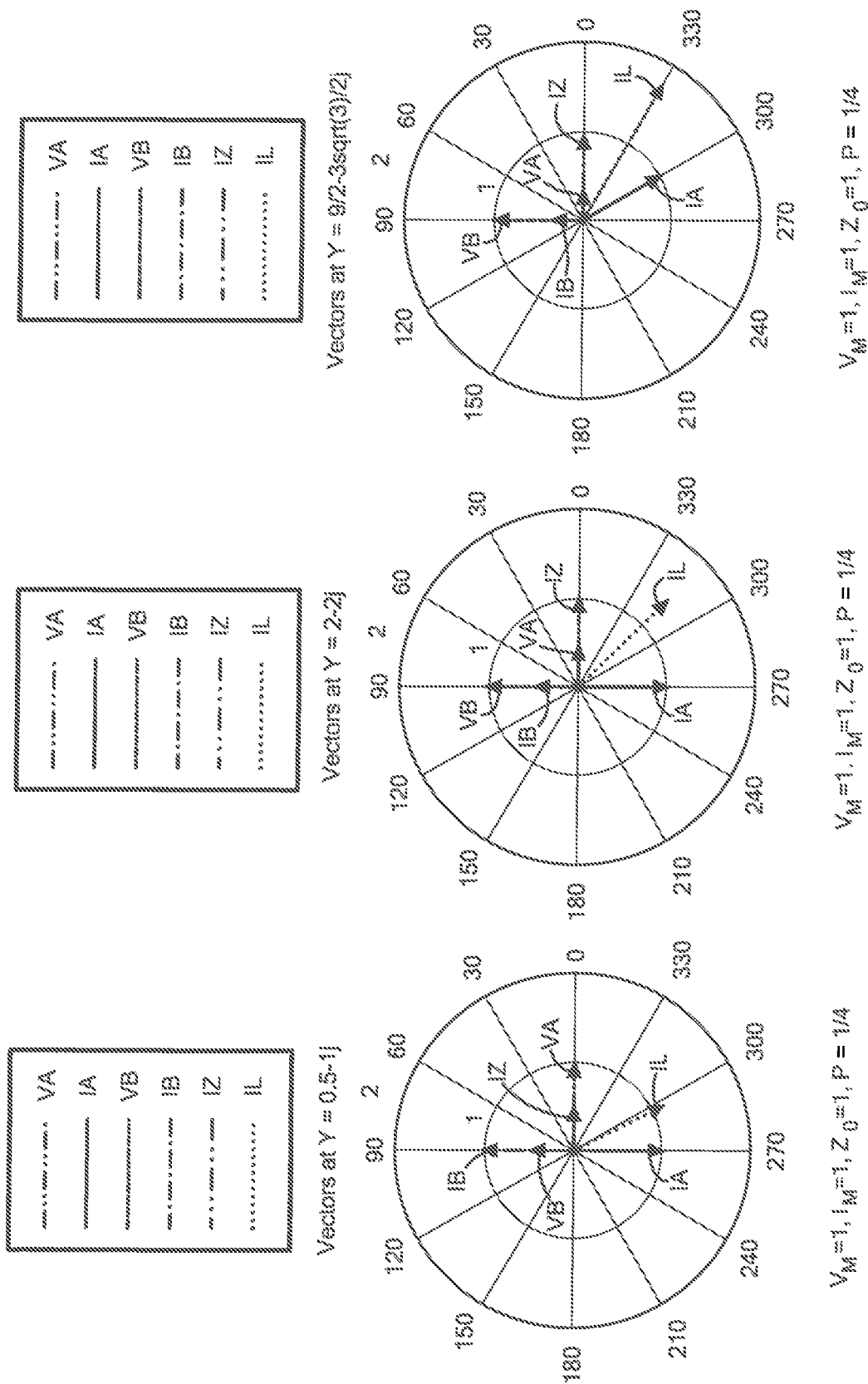

Referring now to FIG. 8, Smith chart results are shown normalized to a characteristic admittance of $Y_0=1$. This plot reflects the same operating boundaries as FIGS. 6 and 7.

It can be observed that the admittance regions encompassed in FIGS. 5, 6 and 8 are symmetric about zero susceptance, and the impedance regions in FIG. 7 are symmetric about zero reactance. It should, of course, be appreciated that the operating ranges can be made nonsymmetric by inclusion of "offset" reactance(s) in shunt and/or series with the load.

Also, it should be noted that the operating boundaries indicated in FIGS. 5-8 assume the use of inverters which operate well under all of pure resistive, pure inductive, and combination resistive/inductive loading. Thus, to meet these boundaries, the inverters must be able to efficiently supply a purely resistive load. Inverters requiring external inductive loading can be accommodated by adjusting the relative inverter phases such that each inverter sees a sufficient inductive load through action of the immittance converter (as illustrated in FIGS. 2 and 3), while incurring a degree of reduction in the operating boundaries. In the description below, it is assumed that the inverters are designed to operate with any combination of resistive and inductive loading within their voltage and current ratings.

There are many high-frequency inverter designs that can operate well within the constraints of resistive/inductive loading described above. One option is a ZVS class D or class DE inverter having either a matching network or inductive pre-load network such that it can operate with soft switching into a variable resistive/inductive load. Another option is an appropriately-designed single-switch inverter (e.g., class E, class $\phi_2$, etc.). While "classical' Class-E inverter designs impose significant constraints on loading to maintain ZVS, some single-switch inverters are suitable for variable-load operation, In particular, the variable-load class E design and other single-switch inverter designs introduced in (L. Roslaniec, A. S. Jurkov, A. Al Bastami and D. J. Perreault "Design of Single-Switch Inverters for Variable Resistance/Load Modulation Operation," IEEE Transactions on Power Electronics, Vol. 30, No. 6, pp. 3200-3214, June 2015.) can operate with low loss across a wide range of resistive, resistive/inductive and inductive loads. While some systems only explicitly treat design for variable load resistance, the resulting inverter designs can maintain ZVS and low loss for resistive/inductive and pure inductive loads as well, so long as the active switch has an antiparallel diode or equivalently provides reverse conduction. Modulation of the individual inverter output amplitudes (as necessary for the proposed architecture) may be relatively easily realized by modulating the inverter supply voltages (e.g., using dc-dc converters to vary the inverter dc supplies, also known as "drain modulation"), though other means are also possible.

It should be noted that the operating points on the boundaries of FIGS. 5-8 reflect the most extreme loads that can be driven at the specified power levels by inverters operating within maximum peak ac voltage and current rating $V_M$ and $I_M$. As such, there is typically only one set of control commands (inverter amplitudes and phases) that can support these operating points. By contrast, there are many combinations of amplitudes and phases that can support many interior points (as one could divide power between the two inverters in various ways for these interior points). This, in turn, means that there are multiple ways the system can be controlled to achieve the desired output. Many of these control means share the above-described characteristic of which inverter takes on the supply of the susceptive portion of the load current (after compensating any offset components in the susceptive range) depending upon whether this susceptive portion is inductive or capacitive. Described below is one possible control strategy.

One possible control strategy (explained herein in terms of in-phase and quadrature components of inverter voltages) may be as follows. An in-phase component of $V_A$ (denoted as $V_{AI}$) sets an output power level, provides any inductive portion of load current and provides any conductive portion of load current not supplied by $V_B$. A quadrature component of $V_A$ (denoted as $V_{AQ}$) is set to a reference value (e.g. zero). An in-phase component of $V_B$ (denoted as $V_{BI}$) is set to provide an amount of a conductive portion of a load current within inverter voltage limit $V_{BI} \leq (V_M^2 - V_{BQ}^2)^{1/2}$. In preferred embodiments, the in-phase component of $V_{BI}$ is set to provide as much of the conductive portion of the load current as possible within inverter voltage limit. A quadrature component of $V_B$ (denoted as $V_{BQ}$) provides capacitive portions of the load current and sets additional reactive current for ZVS switching. Such control strategy results in an inverter system capable of dynamically adjusting to varying impedances of a load coupled to an output thereof.

As noted above, the example control strategy described herein is based upon in-phase and quadrature components of the voltage common as provided to inverters 12a, 12b. This I/Q representation carries the same information as the magnitudes and phases of the inverter voltages. The I/Q relationships can be defined such that the quadrature component for each inverter leads its in-phase component by 90°, and the in-phase component of inverter 12b leads that of inverter 12a by 90°. The in-phase component of inverter 12a ($V_{AI}$) may be arbitrarily defined to be the desired output voltage phase reference such that the voltage of inverter 12a is defined by its in-phase component and has zero quadrature component ($V_{AQ}=0$). The in-phase component of inverter 12b ($V_{BI}$) may be defined as leading the in-phase component of inverter A by 90°. Thus, in terms of phasors. $V_A=V_{AI}$ and $V_B=-V_{BQ}+jV_{BI}$. To achieve the desired control goals, the in-phase and quadrature components of the two inverters may be selected as shown in Table I (i.e. Table I shows a control method based upon setting in-phase and quadrature components of the inverter voltages to achieve the desired output power and inverter loading characteristics).

TABLE I

| | |
|---|---|
| $V_{AI}$ | Set amplitude (within $0 \leq V_{AI} \leq V_M$) to achieve desired reference output power $P_{o,ref}$ ($V_{AI}$ is thus used to set output power). |
| $V_{AQ}$ | Set to zero (by definition of the desired phase of $V_A$). |
| $V_{BQ}$ | Set within $0 \leq V_{BQ} \leq V_M$ to drive $I_{AQ}$ to zero ($V_{BQ}$ is thus used to drive any capacitive component of inverter A loading to zero, and becomes zero when t load is inductive). |
| $V_{BI}$ | Set within $0 \leq V_{BI} \leq (V_M^2 - V_{BQ}^2)^{1/2}$ to drive $I_{AI}$ towards $0^+$ limited by the requirement on $V_{BQ}$ above and by the allowed total operating voltage of invert ($V_{BI}$ is thus set such that inverter B will deliver as much of the real component the output power as possible within the voltage rating of inverter B and while maintaining the current sourced by inverter A to be zero or positive). |

This control technique (supported by appropriate measurements and feedback compensators) can provide a desired output and inverter loading characteristics across the operating range.

FIGS. 9A-9F are a series of phasor representations of system voltages and currents for different load admittances with $V_M=1$, $I_M=1$, $Z_0=1$ and P=0.5 $P_{r,i}=0.25$ using the control approach specified in Table I. The load admittances correspond to some of the boundary operating points specified in FIG. 5;

Thus, FIGS. 9A-9F show the resulting inverter voltages and current phasors using the above-described control technique for six of the boundary operating points indicated in FIG. 5 (six load admittances at P=0.5·$P_{r,i}$ with normalized inverter ratings $V_M=1$, $I_M=1$ and $Z_0=1$). The relationships between inverter 12a voltage ($V_A$) and inverter 12b current ($I_B$), and inverter 12b voltage ($V_A$) and immittance converter output current ($I_Z$) are apparent.

FIGS. 9A-9F illustrate that inverters 12*a*, 12*b* both maintain resistive/inductive loading for all operating points. Moreover, it can be seen that any capacitive component of load current is provided by inverter 12*b* through the immittance converter 16, while any inductive component of load current is provided directly by inverter 12*a*.

Figure 10:
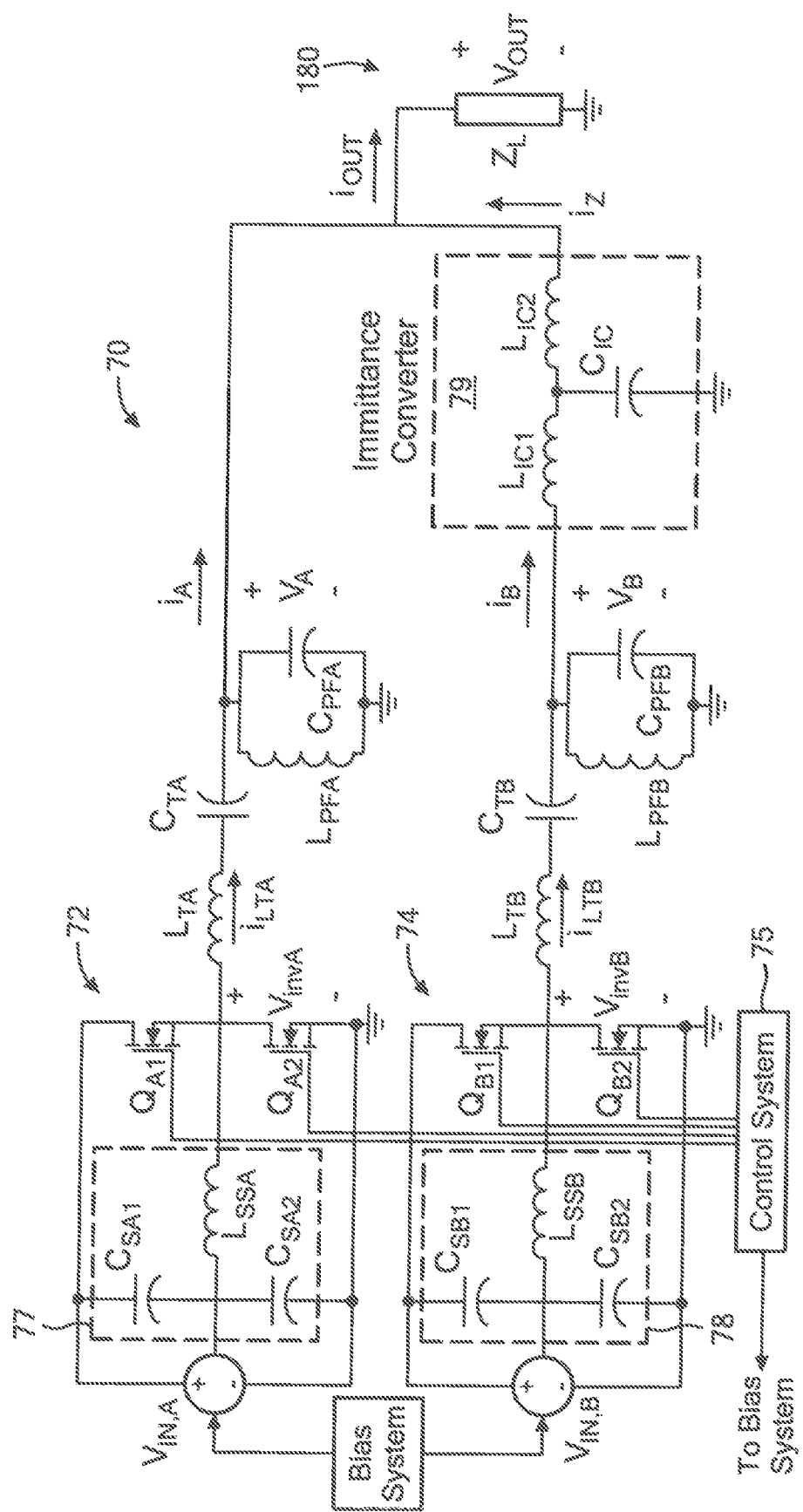
FIG. 10 is a schematic diagram of an example circuit implementation of a system having a high frequency variable load inverter architecture based on zero-voltage switching (ZVS) class D inverters with inductive preload networks and a lumped "T" implementation of an immittance converter.

Referring now to FIG. 10, an example circuit implementation of a system 70 having a high frequency variable load inverter architecture provided from zero-voltage switching (ZVS) class D inverters 72, 74 with inductive preload networks 76, 78 and a lumped "T" implementation of an immittance converter 79. Component values for operating at a switching frequency of 13.56 MHz are shown in Table II.

TABLE II

| | |
|---|---|
| $V_{INA}$ | 0-160 $V_{DC}$ |
| $V_{INB}$ | |
| $C_{SA1}$, $C_{SA2}$, $C_{SB1}$, $C_{SB2}$ | 1 μF |
| $L_{SSA}$, $L_{SSB}$ | 100 nh |
| $Q_{A1}$, $Q_{A2}$, $Q_{B1}$, $Q_{B2}$ | $R_{ON}$ = 50 mΩ |
| | $C_{OSS}$ = 40 pf |
| $L_{TA}$, $L_{TB}$, $L_{PFA}$, $L_{PFB}$ | 470 nH |
| $C_{TA}$, $C_{TB}$, $C_{PFA}$, $C_{PFB}$ | 294 pF |
| $L_{IC1}$, $L_{IC2}$ | 117 nH |
| $C_{IC}$ | 117 nF |

The example circuit of FIG. 10 thus represents a simulated 13.56 MHz inverter system having component values as shown in Table II (i.e. Table II shows component values for the example inverter system of FIG. 10).

The ZVS class D inverters (operated with 11 ns switching deadtime) utilize the inductive preload networks to provide ZVS soft switching under resistive or resistive/inductive loading. The immittance converter has a characteristic impedance of 10Ω and is realized as a T network. Notional values for $V_M$ and $I_M$ are 100 V and 10 A, respectively, though these are only approximate in practice. The inverter devices are modeled as having 50 mΩ on-state resistance and 400 pF output capacitance, commensurate with available devices. The inverters are each provided with series and parallel filter networks 77, 78 tuned at the switching frequency for harmonic reduction. The dc input voltages and relative switching phases of the two inverters are dynamically varied to control the system in accordance with the concepts and techniques described herein. Such control may be implemented through control system 75 and bias system 76 (e.g. a drain voltage bias system).

Figure 11A:
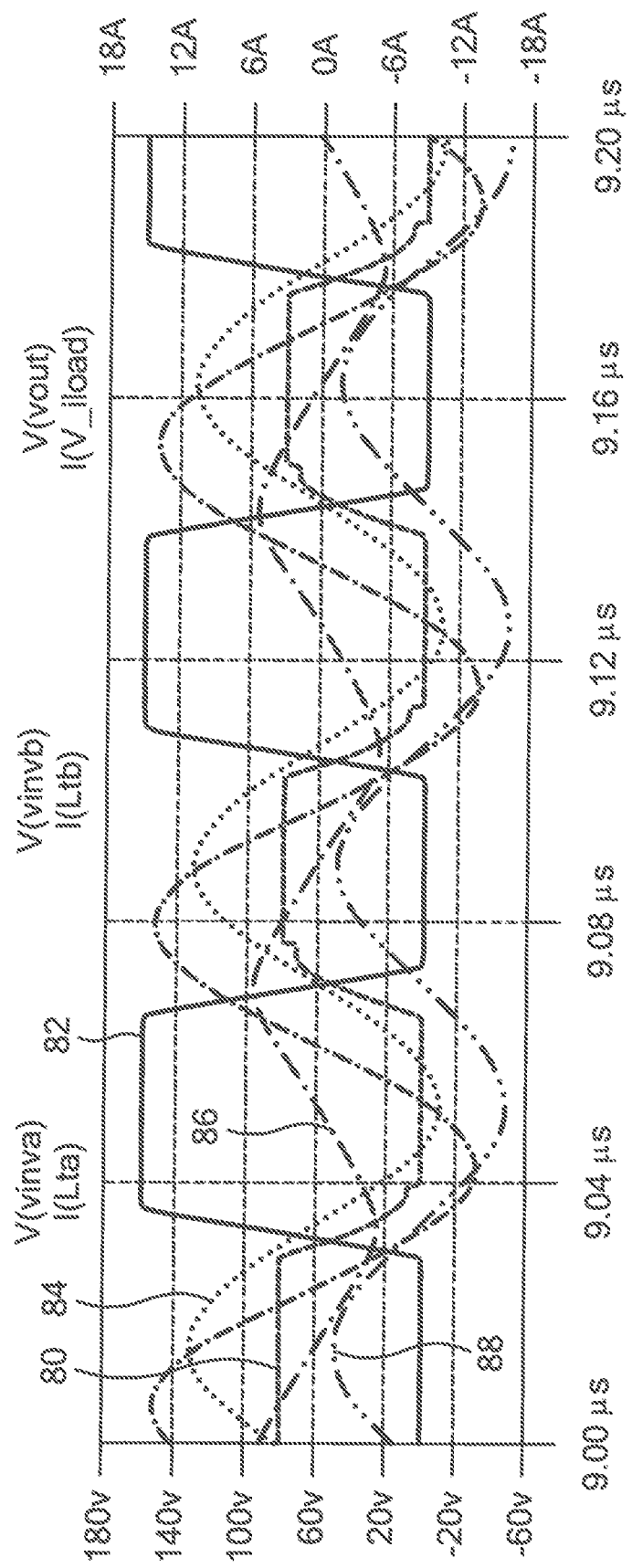
FIGS. 11A and 11B are plots of voltage vs. time for an inverter system which may be the same as or similar to the system of FIG. 10.
Figure 11B:
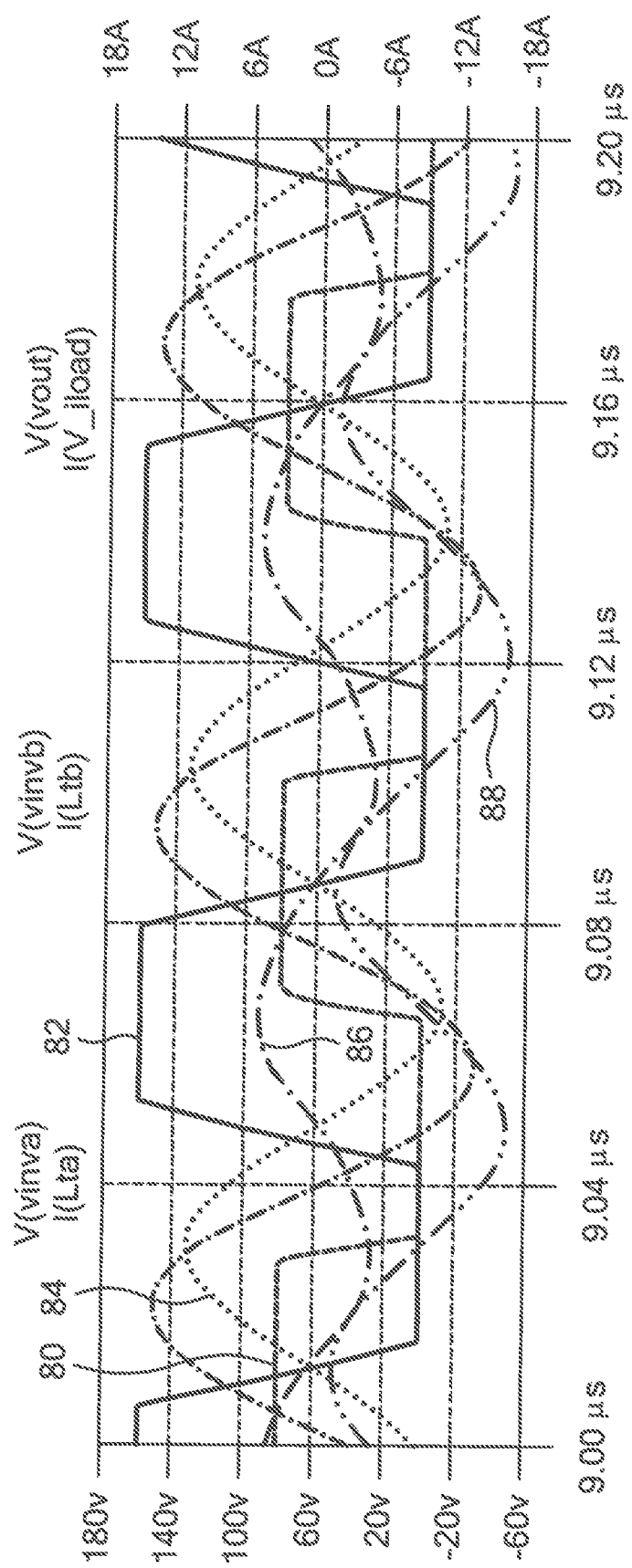

FIGS. 11A, 11B are LTSPICE simulations showing the behavior of an inverter system which may be the same as or similar to the example system of FIG. 10 having the values show in Table II. This system operations at a frequency 13.56 MHz with a system characteristic admittance of $Y_0$=0.1.

Referring now to FIGS. 11A and 11B, shown are example simulation results for a system which may be the same as or similar to the system of FIG. 10. Curves 80, 82 correspond to the unfiltered outputs of the ZVS soft-switched inverters 12*a* 12*b* and curves 84 and 86 are their respective currents (providing resistive and/or inductive loading of the inverters). Curve 88 corresponds to the output (load) voltage.

FIG. 11A illustrates operation with a resistive/capacitive load comprising a 5Ω resistor in parallel with a 2.34 nF capacitor (representing an admittance of approximately 0.2+ 0.2j). This operating point is achieved with dc input voltages $V_{IN,A}$=80 V and $V_{IN,B}$=160 V, with the fundamental output voltage component of inverter B leading that of inverter A by approximately 180°.

FIG. 11B illustrates operation for a resistive/inductive load comprising a 5Ω resistor in parallel with a 58.7 nH inductor (representing an admittance of approximately 0.2- 0.2j). This operating point also utilizes dc input voltages $V_{IN,A}$=80 V and $V_{IN,B}$=160 V, but with the fundamental output voltage component of inverter 12*b* (FIG. 1A) leading that of inverter 12*a* by approximately 90°. These two operating points correspond approximately to those of the middle column in FIG. 9 (with values appropriately renormalized for $V_M$, $I_M$ and $Z_0$).

It can be seen that zero-voltage switching of each inverter is maintained for both the resistive/capacitive and resistive/ inductive load cases. Moreover, the output waveforms match well with the underlying theory. For the resistive/ capacitive case, the ac output voltage has a peak value of 48.6 V and the system delivers 234 W, while in the resistive/ inductive case the peak ac output voltage is 48.8 V, and the system delivers 238 W. These simulation results illustrate the ability of the architecture and control/operating techniques described herein to operate with a wide range of load impedances including both capacitive and inductive loads and show how such a system might work with practical inverter designs.

What is claimed is:

1. An inverter system having an output with the output configured to be coupled a load, the inverter system comprising:
   a first inverter having an output adapted to be directly connected to the load wherein the first inverter is coupled such that the first inverter output is coupled in series or in parallel with the load;
   an immittance converter having first and second ports;
   a second inverter having an output coupled to the load through said immittance converter and wherein said immittance converter is configured such that one of said first and second immittance converter ports is coupled in parallel or series with the load; and
   a controller coupled to provide control signals to said first and second inverters such that a capacitive susceptance is applied to a load current by said second inverter via said immittance converter, and an inductive susceptance is applied to the load current by said first inverter.

2. The inverter system of claim 1, wherein the first inverter is coupled such that the first inverter output is in parallel with the load.

3. The inverter system of claim 1, wherein said first inverter is coupled such that the first inverter output is in series with the load.

4. The inverter system of claim 1, wherein said controller is coupled to said first and second inverters and configured to controlling at least one of the inverter output voltages by controlling an inverter bias voltage.

5. The inverter system of claim 1, further wherein said controller is coupled to provide control signals to said first and second inverters and is configured to dynamically vary each of the inverter output voltages and relative output phases of the first and second inverters to control the system.

6. The inverter system of claim 5, wherein said controller controls the first and second inverters such that each inverter is configured to present a load impedance having at least one of a resistive or inductive characteristic so that an inductive loading component is configured to couple to a reactive component of the load current, and to provide zero-voltage switching (ZVS) to said inverters.

7. The inverter system of claim 1, further comprising first and second preload networks each coupled to at least one of said first and second inverters and configured to provide zero voltage switching (ZVS) under at least one of a resistive or inductive loading.

8. The inverter system of claim 1, wherein the immittance converter comprises a T network.

9. In an inverter system having a first inverter directly coupled to a load with an output in parallel or in series with the load and a second inverter coupled to the load through an immittance converter with one port of the immittance converter in parallel or series with the load, a method of operating the inverter system comprising:
 (a) setting an in-phase component of a voltage command ($V_{AI}$) to the first inverter to achieve a desired radio frequency (RF) power level at an RF output of the second inverter;
 (b) setting a quadrature-phase component of a voltage command ($V_{AQ}$) to the first inverter to a first reference value;
 (c) setting a quadrature-phase component of a voltage command ($V_{BQ}$) to the second inverter such that the second inverter drives a capacitive component of the first inverter loading to approximately zero, and wherein the quadrature-phase component of a voltage command ($V_{BQ}$) to the second inverter becomes zero when the load is inductive; and
 (d) setting an in-phase component of a voltage command (VD) to the second inverter such that the second inverter delivers to the load a real component of an output power which is within the voltage rating of second inverter while maintaining an in-phase current sourced by first inverter to be zero or positive.

10. The method of claim 9, wherein setting an in-phase component of a voltage command ($V_{AI}$) to the first inverter comprises:
 setting a voltage amplitude of the in-phase component of the voltage command to the first inverter within a range of $0 \le V_{AI} \le V_M$ to achieve a desired reference output power $P_o$ wherein $V_M$ corresponds to a maximum peak ac voltage rating of the first inverter.

11. The method of claim 9, wherein setting a quadrature-phase component of a voltage command to the second inverter comprises:
 setting an amplitude of a quadrature-phase component of a voltage command to the second inverter to be within the range of $0 \le V_{BQ} \le V_M$ wherein $V_M$ corresponds to a maximum peak ac voltage rating of the first inverter.

12. The method of claim 11, wherein:
 setting a quadrature-phase component of a voltage command to the second inverter comprises setting the amplitude of a quadrature-phase component of a voltage command to the second inverter to drive capacitive components of the first inverter loading to zero, and wherein in response to the load being inductive, the quadrature-phase component of a voltage command to the second inverter becomes zero.

13. The method of claim 9, wherein setting the amplitude of the in-phase component of a voltage command to the second inverter comprises:
 setting the amplitude of the in-phase component of the voltage command to the second inverter within the range of 0 to $(V_M^2 - V_{BQ}^2)^{1/2}$.

14. The method of claim 9, wherein the in-phase component of a voltage command to the second inverter is selected to drive an in-phase current $I_{AI}$ of the first inverter towards zero.

15. The method of claim 14, wherein selecting the in-phase component of a voltage command to the second inverter is limited by:
 (1) the requirement that the amplitude of the quadrature-phase component of a voltage command to the second inverter be within the range of $0 \le V_{BQ} \le V_M$; and
 (2) the allowed total operating voltage of the second inverter.

16. The method of claim 9, wherein the first reference value is zero.

17. A method for providing efficient delivery of high frequency (HF) power into a load having a variable load impedance, the method comprising:
 (a) controlling a first inverter to achieve a desired radio frequency (RF) power level at an RF output thereof; and
 (b) controlling a second inverter such that the second inverter drives a capacitive component of the first inverter loading to approximately zero, and a quadrature-phase component of a voltage command to the second inverter becomes approximately zero when the load is inductive such that the second inverter delivers, into the load, a real component of the output power having an amplitude within a voltage rating of the second inverter while concurrently maintaining a positive or substantially zero in-phase current sourced by the first inverter such that the first and second inverters are configured to provide a load impedance having at least one of a resistive or inductive characteristic.

18. The method of claim 17, further controlling the first and second inverters to have an inductive loading component configured to supply a reactive component of a load current and provide zero-voltage switching (ZVS) to said inverters.

19. The method of claim 18, wherein in response to the load having an inductive impedance characteristic, the second inverter is configured to deliver a real component of the HF output power according to the second inverter voltage rating so that the in-phase component of current sourced by the first inverter is at least zero.

20. A method for providing efficient delivery of radio frequency (RF) power from an inverter into a load having a variable load impedance, the method comprising:
 (a) controlling a first inverter to achieve a desired RF power level at an RF output thereof; and
 (b) controlling a second inverter to drive capacitive components of first inverter loading to zero.

21. The method of claim 20, wherein in response to the load being inductive, a quadrature-phase component of a voltage command provided to the second inverter becomes zero such that the second inverter delivers, into the load, a real component of the output power according to the second inverter voltage rating while concurrently maintaining a real power sourced by the first inverter to be at least zero.

22. The method of claim 20, further comprising controlling the first and second inverters such that each inverter is configured to a load impedance having at least one of a resistive or inductive characteristic so that an inductive loading component is limited to providing a reactive component of a load current and to provide zero-voltage switching (ZVS) to said inverters.

* * * * *